United States Patent
Ishikura et al.

(10) Patent No.: US 10,365,507 B2
(45) Date of Patent: Jul. 30, 2019

(54) SEMICONDUCTOR OPTICAL INTEGRATED CIRCUIT

(71) Applicant: FUJIKURA LTD., Tokyo (JP)

(72) Inventors: Norihiro Ishikura, Sakura (JP); Kazuhiro Goi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/977,050

(22) Filed: May 11, 2018

(65) Prior Publication Data

US 2018/0341126 A1    Nov. 29, 2018

(30) Foreign Application Priority Data

May 26, 2017  (JP) ................... 2017-104883

(51) Int. Cl.
*G02F 1/01*    (2006.01)

(52) U.S. Cl.
CPC ........ *G02F 1/0147* (2013.01); *G02F 2201/06* (2013.01); *G02F 2202/10* (2013.01); *G02F 2203/21* (2013.01)

(58) Field of Classification Search
None
See application file for complete search history.

(56) References Cited

U.S. PATENT DOCUMENTS

2008/0159681 A1    7/2008   Gill et al.
2017/0131576 A1*   5/2017   Gill .................. G02F 1/0147

FOREIGN PATENT DOCUMENTS

| JP | 8-75937 A | 3/1996 |
| JP | 2013-3442 A | 1/2013 |
| JP | 2015-41070 A | 3/2015 |
| WO | 2012/064472 A2 | 5/2012 |

OTHER PUBLICATIONS

Office Action dated Sep. 25, 2018, issued in counterpart Japanese Application No. 2017-104883. (2 pages).
Office Action dated Apr. 9, 2019, issued in counterpart JP application No. 2017-104883, with English translation. (8 pages).

* cited by examiner

*Primary Examiner* — Jerry Rahll
(74) *Attorney, Agent, or Firm* — Westerman, Hattori, Daniels & Adrian, LLP (57) ABSTRACT

Provided is a semiconductor optical integrated circuit which consumes less electric power than a conventional semiconductor optical integrated circuit. A semiconductor optical integrated circuit (1) includes a semiconductor layer (13) in which (i) an optical waveguide (LG) including heated section I1 through I3 and (ii) heater parts H1 and H2 are provided. The optical waveguide (LG) meanders such that the heated sections I1 through I3 are juxtaposed to one another. Each heater part Hi is arranged between a heated section Ii and a heated section Ii+1 which are adjacent to each other.

15 Claims, 5 Drawing Sheets

SEMICONDUCTOR OPTICAL INTEGRATED CIRCUIT

This Nonprovisional application claims priority under 35 U.S.C. § 119 on Patent Application No. 2017-104883 filed in Japan on May 26, 2017, the entire contents of which are hereby incorporated by reference.

TECHNICAL FIELD

The present invention relates to a semiconductor optical integrated circuit. The present invention relates to particularly a semiconductor optical integrated circuit including a semiconductor layer in which an optical modulator, which utilizes a thermooptic effect, is provided.

BACKGROUND ART

There has been widely used a semiconductor optical integrated circuit including a semiconductor layer in which an optical circuit is provided. For example, Patent Literature 1 discloses a semiconductor optical integrated circuit including a semiconductor layer in which an optical modulator, which utilizes a thermooptic effect, is provided.

Figure 6:
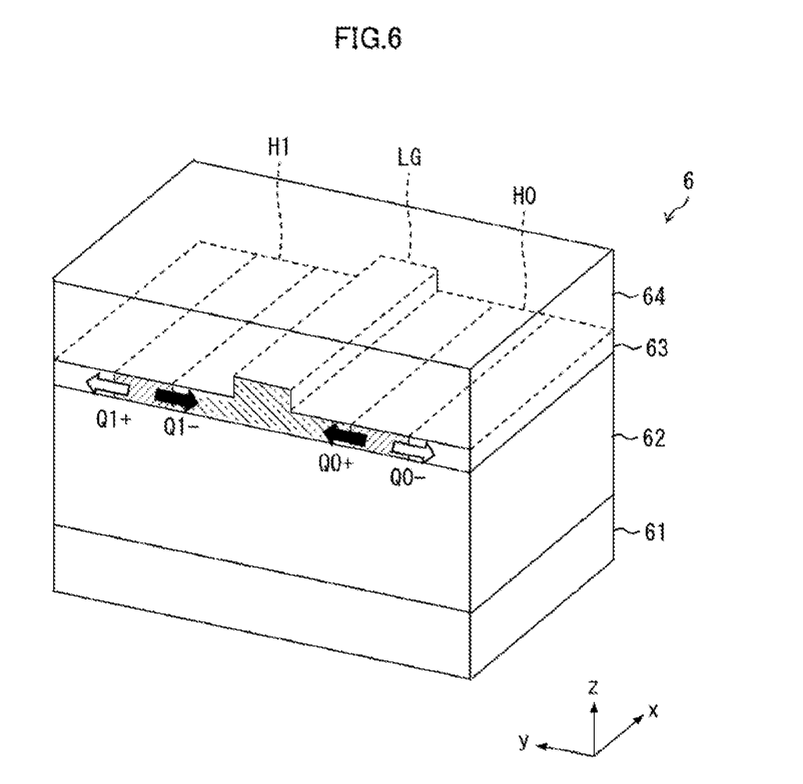
FIG. 6 is a perspective view of a conventional semiconductor optical integrated circuit.

FIG. 6 illustrates a configuration of a semiconductor optical integrated circuit 6 disclosed in Patent Literature 1. The semiconductor optical integrated circuit 6 includes (i) a substrate 61 made of silicon, (ii) a lower cladding layer 62 made of silica, (iii) a semiconductor layer 63 made of silicon, and (iv) an upper cladding layer 64 made of silica. The semiconductor layer 63 includes an optical waveguide LG and heater parts H0 and H1.

According to the semiconductor optical integrated circuit 6, a voltage is applied across the heater parts H0 and H1. This causes the heater parts H0 and H1 to generate heats. It is therefore possible to modulate a phase of light which propagates the optical waveguide LG. This is because a refractive index of the optical waveguide LG changes due to a thermooptic effect which is brought about by an increase in temperature of the optical waveguide LG due to the heats generated by the heater parts H0 and H1.

CITATION LIST

Patent Literature

[Patent Literature 1]
International Publication No. 2012/064472 (International Publication Date: May 18, 2012)

SUMMARY OF INVENTION

Technical Problem

However, the conventional semiconductor optical integrated circuit 6 had the following problem.

That is, the silica of the lower cladding layer 62 and the silica of the upper cladding layer 64 are each lower in thermal conductivity than the silicon of the semiconductor layer 63. This causes heats, which are generated by the heater parts H0 and H1, to diffuse mainly in a plus direction of a y-axis and in a minus direction of the y-axis (see FIG. 6). A heat $Q0+$ of the heat generated by the heater part H0, the heat $Q0+$ diffusing in the plus direction of the y-axis, is used to heat the optical waveguide LG. However, a heat $Q0-$ of the heat generated by the heater part H0, the heat $Q0-$ diffusing in the minus direction of the y-axis, is not used to heat the optical waveguide LG but is wasted. Similarly, a heat $Q1-$ of the heat generated by the heater part H1, the heat $Q1-$ diffusing in the minus direction of the y-axis, is used to heat the optical waveguide LG. However, a heat $Q1+$ of the heat generated by the heater part H1, the heat $Q1+$ diffusing in the plus direction of the y-axis, is not used to heat the optical waveguide LG but is wasted.

Thus, the conventional semiconductor optical integrated circuit 6 cannot use the heats, which are generated by the heater parts H0 and H1, in order to efficiently heat the optical waveguide LG. Hence, the conventional semiconductor optical integrated circuit left room for reduction in power consumption (electric power to be supplied in order to change, by a predetermined amount, a phase of light which propagates the optical waveguide).

The present invention was made to address the problem, and an object of the present invention is to provide a semiconductor optical integrated circuit which consumes less electric power than the conventional semiconductor optical integrated circuit.

Solution to Problem

In order to address the problem, a semiconductor optical integrated circuit in accordance with an embodiment of the present invention is configured to include: a semiconductor layer in which an optical waveguide is provided, the optical waveguide including n heated sections I1 through In, where n is a natural number of not less than 2; and (n−1) heater parts H1 through Hn−1 configured to heat the heated sections I1 through In, the optical waveguide being configured to meander such that the heated sections I1 through In are juxtaposed to each other, and each heater part Hi (where i=1, 2, . . . , n−1) being arranged between a heated section Ii and a heated section Ii+1 which are adjacent to each other.

Advantageous Effects of Invention

The present invention makes it possible to provide a semiconductor optical integrated circuit which consumes less electric power than the conventional semiconductor optical integrated circuit.

BRIEF DESCRIPTION OF DRAWINGS

(a) of FIG. 5 is a cross-sectional view of a heater part included in the semiconductor optical integrated circuit illustrated in each of FIGS. 1 and 2. (b) of FIG. 5 is a cross-sectional view illustrating a variation of the heater part.

DESCRIPTION OF EMBODIMENTS

Embodiment 1

Figure 1:
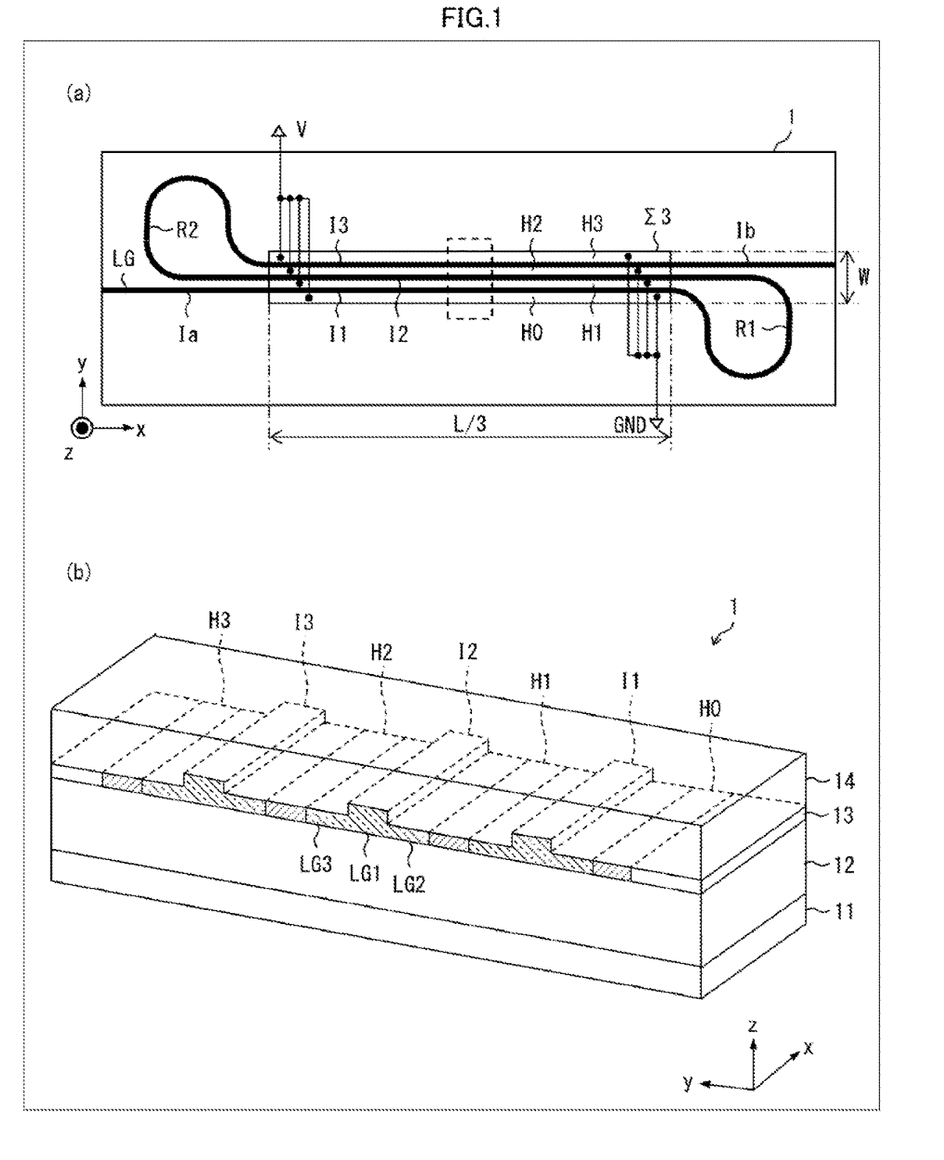
FIG. 1 illustrates a semiconductor optical integrated circuit in accordance with Embodiment 1. (a) of FIG. 1 is a plan view of the semiconductor optical integrated circuit. (b) of FIG. 1 is a perspective view of the semiconductor optical integrated circuit.

The following description will discuss, with reference to FIG. 1, a semiconductor optical integrated circuit 1 in accordance with Embodiment 1 of the present invention. (a) of FIG. 1 is a top view of the semiconductor optical integrated circuit 1. (b) of FIG. 1 is a partly perspective view of the semiconductor optical integrated circuit 1. (b) of FIG. 1 is a view illustrating a part enclosed by a broken line illustrated in (a) of FIG. 1.

The semiconductor optical integrated circuit 1 includes (i) a substrate 11, (ii) a lower cladding layer 12 provided on the substrate 11, (iii) a semiconductor layer 13 provided on the lower cladding layer 12, and (iv) an upper cladding layer 14 provided on the semiconductor layer 13. The semiconductor layer 13 includes an optical waveguide LG and four heater parts H0 through H3.

According to Embodiment 1, the substrate 11 and the semiconductor layer 13 are each made of silicon, and the lower cladding layer 12 and the upper cladding layer 14 are each made of silica. That is, the semiconductor optical integrated circuit 1 in accordance with Embodiment 1 is a silicon optical integrated circuit. Note, however, that materials of layers which constitute the semiconductor optical integrated circuit 1 are not limited as such. The semiconductor optical integrated circuit 1 functions identically with a silicon optical integrated circuit, provided that materials, whose refractive indices are each lower than that of the semiconductor layer 13, are employed as the lower cladding layer 12 and the upper cladding layer 14.

The optical waveguide LG is an optical waveguide of rib-slab type which has a protruding (an inverted T shape) cross section. The optical waveguide LG is composed of a rib part LG1 and two slab parts LG2 and LG3. The rib part LG1 is a relatively tall (thick) part which is located in the center of the optical waveguide LG. The slab parts LG2 and LG3 are relatively short (thin) parts which are located at respective both ends of the optical waveguide LG. Most of light, which propagates the optical waveguide LG, exists in the rib part LG1. It follows that light, which enters the optical waveguide LG via one end surface, propagates the rib part LG1 of the optical waveguide LG and then exits the optical waveguide LG via the other end surface.

According to Embodiment 1, the optical waveguide LG is composed of (i) an incident section Ia, (ii) a first heated section I1 (i.e., a section to be heated or a target section of heating), (iii) a first return section R1, (iv) a second heated section I2, (v) a second return section R2, (vi) a third heated section I3, and (vii) an exit section Ib. The optical waveguide LG meanders such that the first through third heated sections I1 through I3 are juxtaposed to one another. The first through third heated sections I1 through I3 are sections of the optical waveguide LG which are to be heated by the heater parts H0 through H3. Light (i) enters the one end surface, on a starting point side, of the incident section Ia, (ii) propagates the incident section Ia, the first heated section I1, the first return section R1, the second heated section I2, the second return section R2, the third heated section I3, and the exit section Ib in this order, and then (iii) exits the other end surface, on an end point side, of the exit section Ib.

The incident section Ia is a linear section, and extends in a plus direction of an x-axis of a coordinate system illustrated in (a) of FIG. 1. The first heated section I1 is a linear section which starts from an end point of the incident section Ia, and extends in the plus direction of the x-axis of the coordinate system. The first return section R1 is a section which starts from an end point of the first heated section I1, and includes a curve part which changes an extending direction of the optical waveguide LG from the plus direction of the x-axis to a minus direction of the x-axis of the coordinate system. The second heated section I2 is a linear section which starts from an end point of the first return section R1, and extends in the minus direction of the x-axis of the coordinate system. The second return section R2 is a section which starts from an end point of the second heated section I2, and includes a curve part which changes the extending direction of the optical waveguide LG from the minus direction of the x-axis to the plus direction of the x-axis of the coordinate system. The third heated section I3 is a linear section which starts from an end point of the second return section R2, and extends in the plus direction of the x-axis of the coordinate system. The exit section Ib is a linear section which starts from an end point of the third heated section I3, and extends in the plus direction of the x-axis of the coordinate system.

A heater part Hi (where i=0 to 3) is a region of the semiconductor layer 13 to which region a dopant is added. The heater part Hi, to which the dopant is added, is electrically conductive, whereas the optical waveguide LG, to which no dopant is added, is not electrically conductive. Therefore, in a case where a voltage V is applied across the heater part Hi whose one end is grounded (see (a) of FIG. 1), an electric current flows through the heater part Hi. This causes the heater part Hi to generate Joule heat. Alternatively, both the one end and the other end of the heater part Hi can be grounded, and the voltage V can be applied across a center of the heater part Hi and both ends of the heater part Hi, which both ends are grounded. Note that the dopant, with which the semiconductor layer 13 is doped so that each heater part Hi becomes electrically conductive, can be an N-type dopant or a P-type dopant.

According to Embodiment 1, the heater part H1 is arranged between the first heated section I1 of and the second heated section I2 of the optical waveguide LG. Similarly, the heater part H2 is arranged between the second heated section I2 of and the third heated section I3 of the optical waveguide LG. This allows Joule heats generated by the respective heater parts H1 and H2 to be used to efficiently heat the optical waveguide LG.

The Joule heat, generated by the heater part H1, diffuses in a plus direction of a y-axis and in a minus direction of the y-axis. A Joule heat, which diffuses in the plus direction of the y-axis, is used to heat the second heated section I2 of the optical waveguide LG. A Joule heat, which diffuses in the minus direction of the y-axis, is used to heat the first heated section I1 of the optical waveguide LG. Similarly, the Joule heat, generated by the heater part H2, diffuses in the plus direction of the y-axis and in the minus direction of the y-axis. A Joule heat, which diffuses in the plus direction of the y-axis, is used to heat the third heated section I3 of the optical waveguide LG. A Joule heat, which diffuses in the minus direction of the y-axis, is used to heat the second heated section I2 of the optical waveguide LG.

According to Embodiment 1, the heater parts H0 and H3 are further provided in the semiconductor layer 13. The first heated section I1 of the optical waveguide LG is arranged between the heater part H1 and the heater part H0. The third heated section I3 of the optical waveguide LG is arranged between the heater part H2 and the heater part H3. It is therefore possible to use, for the purpose of heating the optical waveguide LG, (i) a Joule heat which is generated by the heater part H0 and which diffuses in the plus direction of the y-axis and (ii) a Joule heat which is generated by the heater part H3 and which diffuses in the minus direction of the y-axis.

The semiconductor optical integrated circuit 1 configured as above functions as a phase modulator which can modulate an optical phase. Specifically, in a case where a voltage is applied across the heater parts H0 through H3, electric currents flow through the respective heater parts H0 through H3. This causes the heater parts H0 through H3 to generate respective Joule heats. The Joule heats increase temperatures of the respective first through third heated sections I1 through I3 of the optical waveguide LG. This brings about a thermooptic effect which causes an increase in refractive indices of the respective first through third heated sections I1 through I3 of the optical waveguide LG. This causes a decrease in speed of light which propagates the first through third heated sections I1 through I3 of the optical waveguide LG. This ultimately causes a delay in phase of light which exits the optical waveguide LG. An amount of such a delay in phase (hereinafter referred to as "phase delay amount") depends on a voltage applied across the heater parts H0 through H3. With the configuration of the semiconductor optical integrated circuit 1, it is therefore possible to modulate the phase of the light which exits the optical waveguide LG, by controlling a voltage V applied across the heater parts H0 through H3.

According to the configuration of the semiconductor optical integrated circuit 1 in accordance with Embodiment 1, as has been described, it is possible to use the Joule heats generated by the respective heater parts H1 and H2 in order to more efficiently heat the optical waveguide LG, as compared with the conventional configuration. This allows a reduction in the voltage V to be applied across the heater parts H0 through H3 so that a given phase delay amount is obtained, as compared with the conventional configuration. In other words, it is possible to reduce an electric power to be supplied to the heater parts H0 through H3 so that the given phase delay amount is obtained, as compared with the conventional configuration. Note that the heater parts H0 and H3 can be eliminated, in a case where the given phase delay amount can be obtained merely by use of the heater parts H1 and H2.

Embodiment 2

Figure 2:
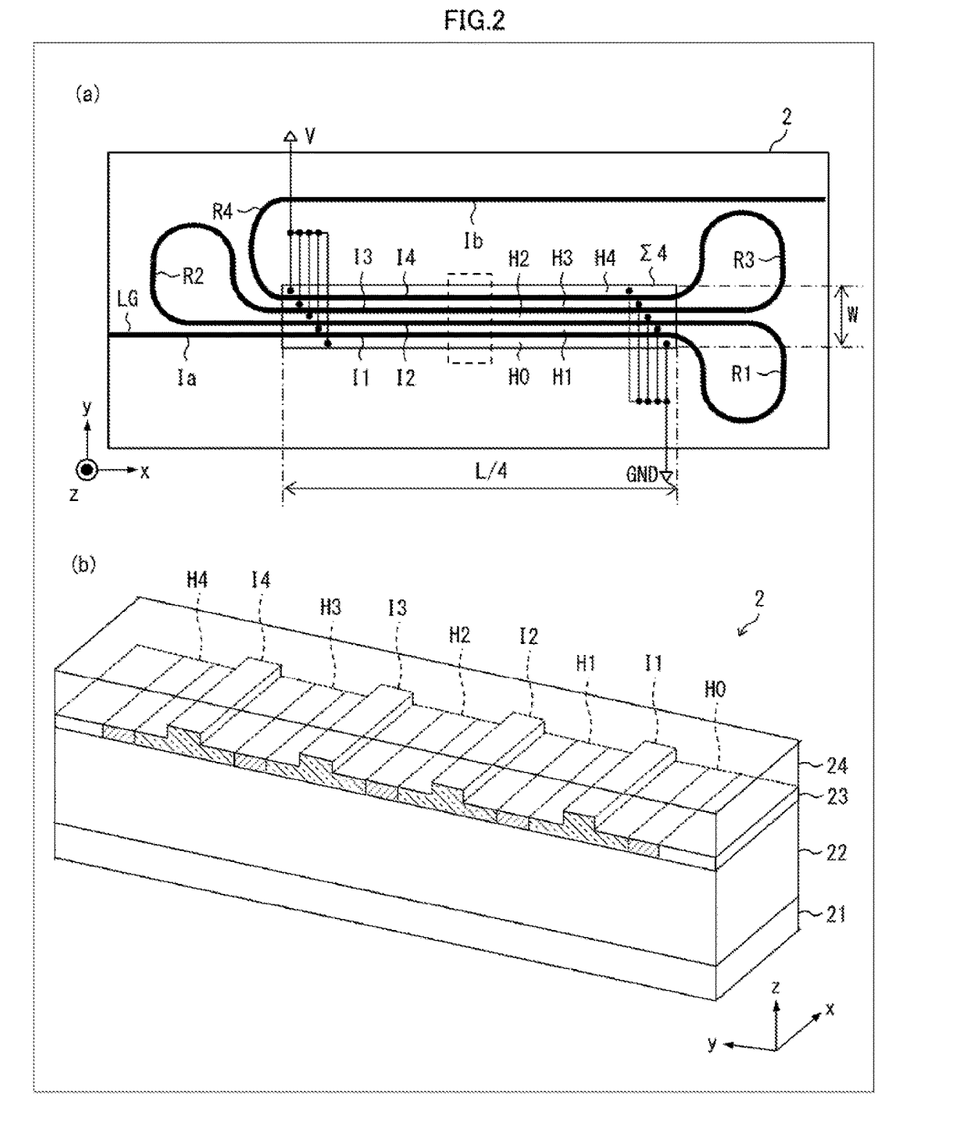
FIG. 2 illustrates a semiconductor optical integrated circuit in accordance with Embodiment 2. (a) of FIG. 2 is a plan view of the semiconductor optical integrated circuit. (b) of FIG. 2 is a perspective view of the semiconductor optical integrated circuit.

The following description will discuss, with reference to FIG. 2, a semiconductor optical integrated circuit 2 in accordance with Embodiment 2 of the present invention. (a) of FIG. 2 is a top view of the semiconductor optical integrated circuit 2. (b) of FIG. 2 is a partly perspective view of the semiconductor optical integrated circuit 2. (b) of FIG. 2 is a view illustrating a part enclosed by a broken line illustrated in (a) of FIG. 2.

The semiconductor optical integrated circuit 2 includes (i) a substrate 21, (ii) a lower cladding layer 22 provided on the substrate 21, (iii) a semiconductor layer 23 provided on the lower cladding layer 22, and (iv) an upper cladding layer 24 provided on the semiconductor layer 23. The substrate 21, the lower cladding layer 22, the semiconductor layer 23, and the upper cladding layer 24, which are included in the semiconductor optical integrated circuit 2, are identical in configuration to the substrate 11, the lower cladding layer 12, the semiconductor layer 13, and the upper cladding layer 14, respectively, which are included in the semiconductor optical integrated circuit 1 in accordance with Embodiment 1, except that the semiconductor layer 23 includes an optical waveguide LG and five heater parts H0 through H4. Similar to Embodiment 1, the optical waveguide LG is an optical waveguide of rib-slab type which has a protruding cross section, and the heater parts H0 through H4 are regions of the semiconductor layer 23 to which regions a dopant is added.

According to Embodiment 2, the optical waveguide LG is composed of an incident section Ia, a first heated section I1 (i.e., a section to be heated or a target section of heating), a first return section R1, a second heated section I2, a second return section R2, a third heated section I3, a third return section R3, a fourth heated section I4, a fourth return section R4, and an exit section Ib. The optical waveguide LG meanders such that the first through fourth heated sections I1 through I4 are juxtaposed to one another. The first through fourth heated sections I1 through I4 are sections of the optical waveguide LG which are to be heated by the heater parts H0 through H4. Light (i) enters one end surface, on a starting point side, of the incident section Ia, (ii) propagates the incident section Ia, the first heated section I1, the first return section R1, the second heated section I2, the second return section R2, the third heated section I3, the third return section R3, the fourth heated section I4, the fourth return section R4, and the exit section Ib in this order, and then (iii) exits the other end surface, on an end point side, of the exit section Ib.

The incident section Ia is a linear section, and extends in a plus direction of an x-axis of a coordinate system illustrated in (a) of FIG. 2. The first heated section I1 is a linear section which starts from an end point of the incident section Ia, and extends in the plus direction of the x-axis of the coordinate system. The first return section R1 is a section which starts from an end point of the first heated section I1, and includes a curve part which changes an extending direction of the optical waveguide LG from the plus direction of the x-axis to a minus direction of the x-axis of the coordinate system. The second heated section I2 is a linear section which starts from an end point of the first return section R1, and extends in the minus direction of the x-axis of the coordinate system. The second return section R2 is a section which starts from an end point of the second heated section I2, and includes a curve part which changes the extending direction of the optical waveguide LG from the minus direction of the x-axis to the plus direction of the x-axis of the coordinate system. The third heated section I3 is a linear section which starts from an end point of the second return section R2, and extends in the plus direction of the x-axis of the coordinate system. The third return section R3 is a section which starts from an end point of the third heated section I3, and includes a curve part which changes the extending direction of the optical waveguide LG from the plus direction of the x-axis to the minus direction of the x-axis of the coordinate system. The fourth heated section I4 is a linear section which starts from an end point of the third return section R3, and extends in the minus direction of the x-axis of the coordinate system. The fourth return section R4 is a section which starts from an end point of the fourth heated section I4, and includes a curve part which changes the extending direction of the optical waveguide LG from the minus direction of the x-axis to the plus direction of the x-axis of the coordinate system. The exit section Ib is a linear section which starts from an end point of the fourth return section R4, and extends in the plus direction of the x-axis of the coordinate system.

According to Embodiment 2, the heater part H1 is arranged between the first heated section I1 of and the second heated section I2 of the optical waveguide LG. Similarly, the heater part H2 is arranged between the second heated section I2 of and the third heated section I3 of the optical waveguide LG. Similarly, the heater part H3 is arranged between the third heated section I3 of and the fourth heated section I4 of the optical waveguide LG. This allows Joule heats generated by the respective heater parts H1, H2 and H3 to be used to efficiently heat the optical waveguide LG.

The Joule heat, generated by the heater part H1, diffuses in a plus direction of a y-axis and in a minus direction of the y-axis. A Joule heat, which diffuses in the plus direction of the y-axis, is used to heat the second heated section I2 of the optical waveguide LG. A Joule heat, which diffuses in the minus direction of the y-axis, is used to heat the first heated section I1 of the optical waveguide LG. Similarly, the Joule heat, generated by the heater part H2, diffuses in the plus direction of the y-axis and in the minus direction of the y-axis. A Joule heat, which diffuses in the plus direction of the y-axis, is used to heat the third heated section I3 of the optical waveguide LG. A Joule heat, which diffuses in the minus direction of the y-axis, is used to heat the second heated section I2 of the optical waveguide LG. Similarly, the Joule heat, generated by the heater part H3, diffuses in the plus direction of the y-axis and in the minus direction of the y-axis. A Joule heat, which diffuses in the plus direction of the y-axis, is used to heat the fourth heated section I4 of the optical waveguide LG. A Joule heat, which diffuses in the minus direction of the y-axis, is used to heat the third heated section I3 of the optical waveguide LG.

According to Embodiment 2, the heater parts H0 and H4 are further provided in the semiconductor layer 23. The first heated section I1 of the optical waveguide LG is arranged between the heater part H1 and the heater part H0. The fourth heated section I4 of the optical waveguide LG is arranged between the heater part H3 and the heater part H4. It is therefore possible to use, for the purpose of heating the optical waveguide LG, (i) a Joule heat which is generated by the heater part H0 and which diffuses in the plus direction of the y-axis and (ii) a Joule heat which is generated by the heater part H4 and which diffuses in the minus direction of the y-axis.

According to the configuration of the semiconductor optical integrated circuit 2 in accordance with Embodiment 2, as has been described, it is possible to use the Joule heats, generated by the respective heater parts H1 through H3, in order to more efficiently heat the optical waveguide LG, as compared with the conventional configuration. This allows a reduction in voltage V to be applied across the heater parts H0 through H4 so that a given phase delay amount is obtained, as compared with the conventional configuration. In other words, it is possible to reduce an electric power to be supplied to the heater parts H0 through H4 so that the given phase delay amount is obtained, as compared with the conventional configuration. Note that the heater parts H0 and H4 can be eliminated, in a case where the given phase delay amount can be obtained merely by use of the heater parts H1 through H3.

[Verification of Effects]

Figure 3:
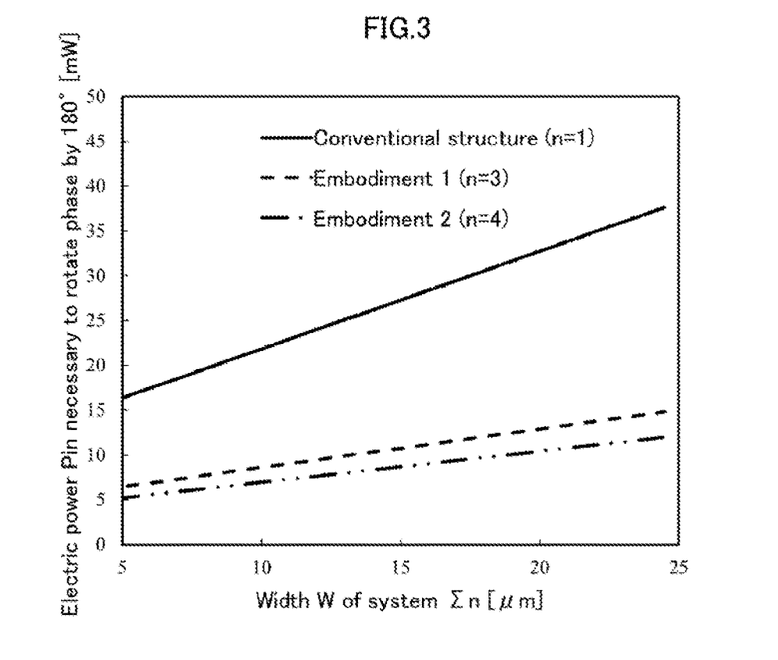
FIG. 3 is a graph showing a result obtained by calculating an electric power Pin, which is necessary to rotate an optical phase by 180°, while changing a width W of a system Σn that is composed of (i) heated sections I1 through In of an optical waveguide of a semiconductor optical integrated circuit illustrated in each of FIGS. 1, 2 and 6 and (ii) heater parts H0 through Hn of the semiconductor optical integrated circuit.
Figure 4:
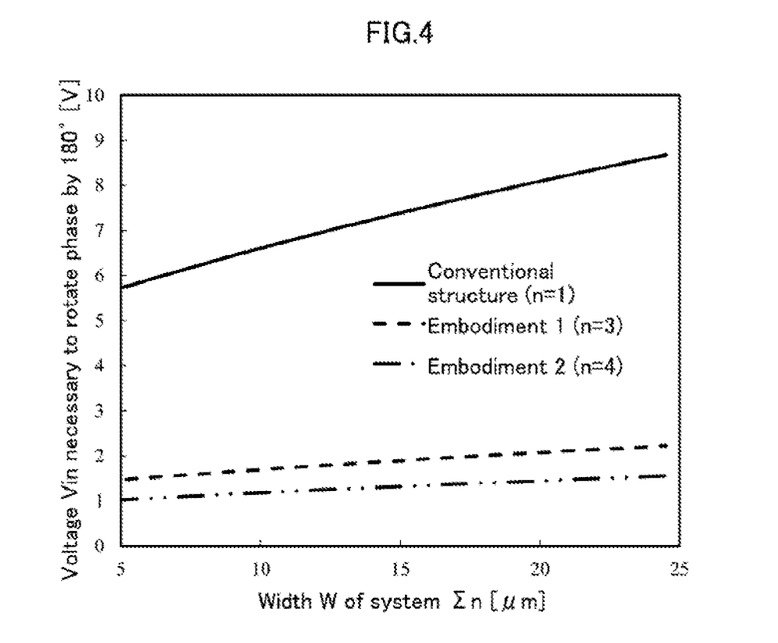
FIG. 4 is a graph showing a result obtained by calculating a voltage Vin, which is necessary to rotate the optical phase by 180°, while changing the width W of the system Σn that is composed of (i) the heated sections I1 through In of the optical waveguide of the semiconductor optical integrated circuit illustrated in each of FIGS. 1, 2 and 6 and (ii) the heater parts H0 through Hn of the semiconductor optical integrated circuit.

The following description will discuss, with reference to FIGS. 3 and 4, (i) an effect brought about by the semiconductor optical integrated circuit 1 of Embodiment 1 and (ii) an effect brought about by the semiconductor optical integrated circuit 2 of Embodiment 2.

The semiconductor optical integrated circuit 1 (see FIG. 1) of Embodiment 1 includes a system Σ3 that is composed of (i) the three heated sections I1 through I3 of the optical waveguide LG and (ii) the four heater parts H0 through H3. The semiconductor optical integrated circuit 2 (see FIG. 2) of Embodiment 2 includes a system Σ4 that is composed of (i) the four heated sections I1 through I4 of the optical waveguide LG and (ii) the five heater parts H0 through H4. The semiconductor optical integrated circuits 1 and 2, which include the systems Σ3 and Σ4 respectively, can be generalized down to a semiconductor optical integrated circuit which includes a system Σn that is composed of (i) n heated sections I1 through In of an optical waveguide LG and (ii) (n+1) heater parts H0 through Hn. The conventional semiconductor optical integrated circuit 6 (see FIG. 6) can be regarded as a semiconductor optical integrated circuit which includes a system Σ1 that is composed of (i) a single heated section I and (ii) two heater parts H0 and H1.

In a case of considering a thermal circuit equation of the system Σn that is composed of (i) the n heated sections I1 through In and (ii) the (n+1) heater parts H0 through Hn, a temperature change ΔT of the system Σn is calculated by the following expression (1). In the expression (1), θ represents a thermal resistance of the system Σn, and P represents an electric power supplied to the heater parts H0 through Hn.

$$\Delta T = \theta \times P \tag{1}$$

The thermal resistance of the system Σn is calculated by the following expression (2). In the expression (2), κ represents a thermal conductivity of the system Σn, S represents an area of the system Σn, and t represents a distance from the system Σn to a thermally stable surface (i.e., a distance from the semiconductor layer 13 or 23 to an upper surface of the substrate 11 or 21, respectively).

$$\theta = \frac{t}{\kappa S} \tag{2}$$

In a case where the optical waveguide LG is made of silicon, it is experimentally known that a relation represented by the following expression (3) is established between the temperature change ΔT of the system Σn and a refractive index change Δn of the heated sections I1 through In of the optical waveguide LG.

$$\Delta n / \Delta T = 1.86 \times 10^{-4} / K \tag{3}$$

A heating efficiency E of the semiconductor optical integrated circuit is calculated by the following expression (4) which uses the expressions (1) through (3). In the expression (4), η represents an optical confinement factor in the optical waveguide LG, L represents a sum of lengths of the respective heated sections I1 through In of the optical waveguide LG, $n_g$ represents a group refractive index of the optical waveguide LG, and $\lambda_0$ represents a wavelength, in vacuum, of light which enters the optical waveguide LG.

$$E = \frac{\Delta n}{\Delta T} \times \theta \times \eta \times \frac{2\pi L n_g}{\lambda_0} [\text{rad}/W] = \quad (4)$$

$$1.86 \times 10^{-4} \times \frac{t}{\kappa S} \times \eta \times \frac{L n_g}{\lambda_0} \times 360[°/W]$$

An electric power Pin necessary to rotate an optical phase by 180° in the heated sections I1 through In of the optical waveguide LG is calculated by the following expression (5) which uses the heating efficiency E. A voltage Vin necessary to rotate the optical phase by 180° in the heated sections I1 through In of the optical waveguide LG is calculated by the following expression (6) which uses the electric power Pin. In the expression (6), R represents a resistance of each heater part Hi.

$$P_{in} = \frac{180}{E} [W] \quad (5)$$

$$V_{in} = \sqrt{P_{in} R} [V] \quad (6)$$

The resistance R of the heater part Hi, in the expression (6), is calculated by the following expression (7). In the expression (7), $R_s$ represents a sheet resistance of the heater part Hi, and $W_{Heater}$ represents a width of the heater part Hi.

$$R = \frac{R_S \times L}{W_{Heater} \times (n+1)} \quad (7)$$

The electric power Pin and the voltage Vin, which are defined as above, can be used as respective indices which indicate power saving of the semiconductor optical integrated circuit. As to each of (a) the semiconductor optical integrated circuit 1 in accordance with Embodiment 1, (b) the semiconductor optical integrated circuit 2 in accordance with Embodiment 2, and (c) the conventional semiconductor optical integrated circuit 6, an electric power Pin and a voltage Vin were calculated while changing a width W of a system Σn. Note that the electric power Pin and the voltage Vin were calculated under conditions where (i) κ was 1.9 W/K/m, (ii) t was 3 μm, (iii) η was 0.7, (iv) $n_g$ was 3.8, (v) $\lambda_0$ was 1.55 μm, (vi) L was 100 μm, (vii) Rs was 60 Ω/sq., and (viii) $W_{Heater}$ was 1.5 μm. An area S of the system Σn was calculated by the following expression (8). In the expression (8), α represents a correction coefficient for taking thermal diffusion into account. The correction coefficient α was 10 μm.

$$S = (W + \alpha) \times \left(\frac{L}{n} + \alpha\right) \quad (8)$$

FIG. 3 is a graph showing a result obtained by calculating the electric power Pin while changing the width W of the system Σn. FIG. 3 demonstrates that the electric power Pin of the semiconductor optical integrated circuit 1 (n=3) of Embodiment 1 and the electric power Pin of the semiconductor optical integrated circuit 2 (n=4) of Embodiment 2 were each smaller than that of the conventional semiconductor optical integrated circuit 6 (n=1).

It should be noted that (i) a width W of the system Σ3 of the semiconductor optical integrated circuit 1 of Embodiment 1, (ii) a width W of the system Σ4 of the semiconductor optical integrated circuit 2 of Embodiment 2, and (iii) a width W of the system Σ1 of the conventional semiconductor optical integrated circuit 6 are different from one another. For example, in a case where (a) a rib width of the optical waveguide LG is 0.5 μm, (b) a slab width of the optical waveguide LG is 1 μm, and (c) the width of the heater part Hi is 1.5 μm, the following calculations (i) through (iv) are obtained: (i) the width W of the system Σ3 of the semiconductor optical integrated circuit 1 of Embodiment 1 is 3×(0.5 μm+2×1 μm)+4×1.5 μm=13.5 μm; (ii) the electric power Pin of the semiconductor optical integrated circuit 1 is 10 mW; (iii) the width W of the system Σ4 of the semiconductor optical integrated circuit 2 of Embodiment 2 is 4×(0.5 μm+2×1 μm)+5×1.5 μm=17.5 μm; and (iv) the electric power Pin of the semiconductor optical integrated circuit 2 is 10 mW. Meanwhile, in the above case, the following calculations (v) and (vi) are obtained: (v) the width W of the system Σ1 of the conventional semiconductor optical integrated circuit 6 is 1×(0.5 μm+2×1 μm)+2×1.5 μm=5.5 μm; and (vi) the electric power Pin of the conventional semiconductor optical integrated circuit 6 is 17 mW. It is thus possible to confirm that the electric power Pin of the semiconductor optical integrated circuit 1 of Embodiment 1 and the electric power Pin of the semiconductor optical integrated circuit 2 of Embodiment 2 are each smaller than that of the conventional semiconductor optical integrated circuit 6. Note that, here, it is confirmed that the semiconductor optical integrated circuits 1 and 2 each bring about the effect in a case where a center-to-center distance between a heated section Ii and a heated section Ii+1, which are adjacent to each other, is 4 μm, but even in a case where the center-to-center distance between the heated section Ii and the heated section Ii+1, which are adjacent to each other, is not more than 4 μm, the semiconductor optical integrated circuits 1 and 2 each bring about an effect identical to that brought about in the case where the center-to-center distance, between the heated section Ii and the heated section Ii+1, is 4 μm.

FIG. 4 is a graph showing a result obtained by calculating the voltage Vin while changing the width W of the system Σn. FIG. 4 demonstrates that the voltage Vin of the semiconductor optical integrated circuit 1 (n=3) of Embodiment 1 and the voltage Vin of the semiconductor optical integrated circuit 2 (n=4) of Embodiment 2 were each smaller than that of the conventional semiconductor optical integrated circuit 6 (n=1).

For example, in a case where (i) the rib width of the optical waveguide LG is 0.5 μm, (ii) the slab width of the optical waveguide LG is 1 μm, and (iii) the width of the heater part Hi is 1.5 μm, the width W of the system Σ3 of the semiconductor optical integrated circuit 1 of Embodiment 1 is 13.5 μm, and the voltage Vin of the semiconductor optical integrated circuit 1 is 1.8 V. In the above case, the width W of the system Σ4 of the semiconductor optical integrated circuit 2 of Embodiment 2 is 17.5 μm, and the voltage Vin of the semiconductor optical integrated circuit 2 is 1.4 V. Meanwhile, in the above case, the width W of the system Σ1 of the conventional semiconductor optical integrated circuit 6 is 5.5 μm, and the voltage Vin of the conventional semiconductor optical integrated circuit 6 is 5.8 V. It is thus possible to confirm that the voltage Vin of the semiconductor optical integrated circuit 1 of Embodiment 1 and the voltage Vin of the semiconductor optical integrated circuit 2 of Embodiment 2 are each smaller than that of the conventional semiconductor optical integrated circuit 6. Note that, here, it is confirmed that the semiconductor optical integrated circuits 1 and 2 each bring about the effect in the case where the center-to-center distance between the heated section Ii and the heated section Ii+1, which are adjacent to each other, is 4 μm, but even in the case where the center-to-center distance between the heated section Ii and the heated section Ii+1, which are adjacent to each other, is not more than 4 μm, the semiconductor optical integrated circuits 1 and 2 each bring about an effect identical to that brought about in the case where the center-to-center distance, between the heated section Ii and the heated section Ii+1, is 4 μm.

As has been described, according to each of the semiconductor optical integrated circuit 1 of Embodiment 1 and the semiconductor optical integrated circuit 2 of Embodiment 2, it is possible to reduce the electric power Pin and the voltage Vin, which are required to rotate an optical phase by 180°, as compared with the conventional semiconductor optical integrated circuit 6. A main reason, why the semiconductor optical integrated circuits 1 and 2 each bring about such an effect, mainly resides in that it is possible to use heats, which are generated by the heater parts H1 through Hn, in order to efficiently heat the optical waveguide LG, as has been described. Another reason, why the semiconductor optical integrated circuits 1 and 2 each bring about the effect, resides in that the heater parts H1 through Hn are juxtaposed to each other.

[Additional Remarks]

The present invention is not limited to Embodiments 1 and 2, but can be altered by a skilled person in the art within the scope of the claims. An embodiment derived from a proper combination of technical means each disclosed in a different embodiment is also encompassed in the technical scope of the present invention.

Figure 5:
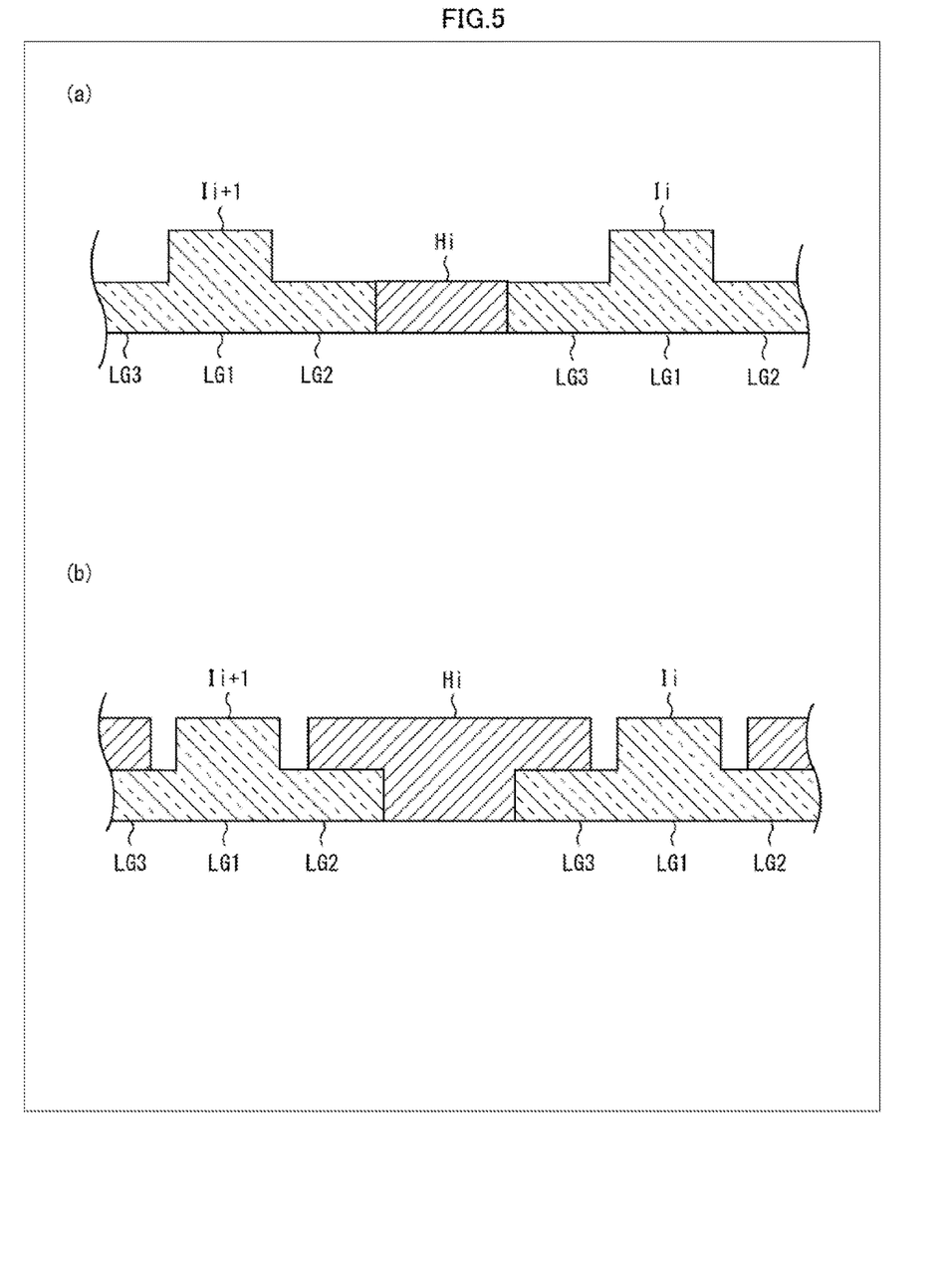

For example, in each of Embodiments 1 and 2, the heater part Hi illustrated in (a) of FIG. 5 is employed. That is, the heater part Hi is employed which has (i) a rectangular cross section and (ii) a height equal to that of each of the slab parts LG2 and LG3 of the optical waveguide LG. According to the heater part Hi, (i) the heater part Hi and the optical waveguide LG are provided on the same surface (on an upper surface of the lower cladding layer 12 or 22) and (ii) an upper surface of the heater part Hi and an upper surface of the slab parts LG2 and LG3 of the optical waveguide LG form a same surface. The present invention, however, is not limited as such. For example, a heater part Hi illustrated in (b) of FIG. 5 can alternatively be employed, instead of the heater part Hi illustrated in (a) of FIG. 5. In other words, the heater part Hi can alternatively be employed which (i) has an inverted protruding shape (i.e., a T shape) cross section and (ii) partially covers slab parts LG2 and LG3 of an optical waveguide LG. In such an alternative, (i) the heater part Hi and the optical waveguide LG are provided on a same surface (the upper surface of the lower cladding layer 12 or 22) and (ii) an upper surface of the heater part Hi and an upper surface of a rib part LG1 of the optical waveguide LG form a same surface.

Moreover, each of Embodiments 1 and 2 employs a configuration in which (i) a corresponding one of the semiconductor layers 13 and 23 has a part to which a dopant is added and (ii) the part serves as the heater part Hi. That is, the heater part Hi is a part of each of the semiconductor layers 13 and 23. The present invention, however, is not limited as such. In other words, the heater part Hi needs merely be arranged between the heated section Ii and the heated section Ii+1, and the heater part Hi therefore does not need to be a part of each of the semiconductor layers 13 and 23. For example, an alternative configuration can be employed in which (i) a thin film made of a high-resistance material, such as a nickel-chromium (NiCr) alloy, is provided between the heated section Ii and the heated section Ii+1 and (ii) the thin film serves as the heater part Hi. In such an alternative, the thin film made of the high-resistance material is provided so as to contact, for example, the lower cladding layers 12 and 22 or the semiconductor layers 13 and 23 which constitute the optical waveguide LG.

[Recap]

A semiconductor optical integrated circuit (1, 2) in accordance with an embodiment of the present invention is configured to include: a semiconductor layer (13, 23) in which an optical waveguide (LG) is provided, the optical waveguide (LG) including n heated sections I1 through In, where n is a natural number of not less than 2; and (n−1) heater parts H1 through Hn−1 configured to heat the heated sections I1 through In, the optical waveguide (LG) being configured to meander such that the heated sections I1 through In are juxtaposed to each other, and each heater part Hi (where i=1, 2, . . . , n−1) being arranged between a heated section Ii and a heated section Ii+1 which are adjacent to each other.

According to the configuration, each heater part Hi is arranged between the heated section Ii and the heated section Ii+1 which are adjacent to each other. It is therefore possible to use heat, which is generated by the heater part Hi, in order to efficiently heat the optical waveguide. This allows a reduction in power consumption (electric power to be supplied in order to change, by a predetermined amount, a phase of light which propagates the optical waveguide), as compared with the conventional configuration.

It is preferable to configure the semiconductor optical integrated circuit (1, 2) in accordance with the embodiment of the present invention such that the optical waveguide (LG) and the heater parts H1 through Hn−1 are provided on a same surface.

The above configuration makes it possible to use the heat, which is generated by the heater part Hi, in order to efficiently heat the optical waveguide, as compared with a case where the optical waveguide and the heater parts H1 through Hn−1 are provided on respective different plane surfaces.

It is preferable to configure the semiconductor optical integrated circuit (1, 2) in accordance with the embodiment of the present invention such that the heater parts H1 through Hn−1 are regions of the semiconductor layer (13, 23) to which regions a dopant is injected.

The above configuration makes it possible to easily realize a heater part for heating an optical waveguide.

It is preferable to configure the semiconductor optical integrated circuit (1, 2) in accordance with the embodiment of the present invention such that a common voltage is applied across the heater parts H1 through Hn−1.

The above configuration makes it possible to efficiently heat an optical waveguide by use of a simple circuit configured to control a heater.

It is preferable to configure the semiconductor optical integrated circuit (1, 2) in accordance with the embodiment of the present invention such that a center-to-center distance between the heated section Ii and the heated section Ii+1, which are adjacent to each other, is not more than 4 μm.

The above configuration makes it possible to (i) efficiently heat an optical waveguide and (ii) increase the density of an optical integrated circuit.

The semiconductor optical integrated circuit (1, 2) in accordance with the embodiment of the present invention is preferably configured to further include: a heater part H0; and a heater part Hn, each heated section Ij (where j=1, 2, . . . , n) being arranged between a heater part Hj−1 and a heater part Hj which are adjacent to each other.

The above configuration makes it possible to use heats, which are generated by the respective heater parts H0 and Hn, in order to heat the optical waveguide. This allows the semiconductor optical integrated circuit in accordance with the embodiment of the present invention to change, by a greater amount, the phase of the light which propagates the optical waveguide than a semiconductor optical integrated circuit which includes neither heater part H0 nor heater part Hn, even in a case where the semiconductor optical integrated circuit in accordance with the embodiment of the present invention and a semiconductor optical integrated circuit which includes neither heater part H0 nor heater part Hn consume the same amount of electric power.

Note that the semiconductor optical integrated circuit (1, 2) in accordance with the embodiment of the present invention can be realized as, for example, a silicon optical integrated circuit. In this case, the semiconductor layer (13, 23) is made of silicon.

REFERENCE SIGNS LIST

1 and 2: semiconductor optical integrated circuit
11 and 21: substrate
12 and 22: lower cladding layer
13 and 23: semiconductor layer
14 and 24: upper cladding layer
LG: optical waveguide
I1 and/through In: heated section
H0 through Hn: heater part

The invention claimed is:

1. A semiconductor optical integrated circuit, comprising:
a semiconductor layer in which an optical waveguide is provided, the optical waveguide including n heated sections I1 through In, where n is a natural number of not less than 2; and
(n+1) heater parts H0 through Hn configured to heat the heated sections I1 through In,
the optical waveguide being configured to meander such that the heated sections I1 through In are juxtaposed to each other, and
each heated section Ii (where i=1, 2, . . . , n) being arranged between a heater part Hi−1 and a heater part Hi which are adjacent to each other.

2. The semiconductor optical integrated circuit as set forth in claim 1, wherein
the optical waveguide and the heater parts H0 through Hn are provided on a same surface.

3. The semiconductor optical integrated circuit as set forth in claim 1, wherein
the heater parts H0 through Hn are regions of the semiconductor layer to which regions a dopant is injected.

4. The semiconductor optical integrated circuit as set forth in claim 1, wherein
a common voltage is applied across the heater parts H0 through Hn.

5. The semiconductor optical integrated circuit as set forth in claim 1, wherein
a center-to-center distance between the heated section Ii and the heated section Ii+1, which are adjacent to each other, is not more than 4 μm.

6. The semiconductor optical integrated circuit as set forth in claim 1, wherein
the semiconductor layer is made of silicon.

7. A semiconductor optical integrated circuit, comprising:
a semiconductor layer in which an optical waveguide is provided, the optical waveguide including n heated sections I1 through In, where n is a natural number of not less than 2; and
(n−1) heater parts H1 through Hn−1 configured to heat the heated sections I1 through In,
the optical waveguide being configured to meander such that the heated sections I1 through In are juxtaposed to each other,
each heater part Hi (where i=1, 2, . . . , n−1) being arranged between a heated section Ii and a heated section Ii+1 which are adjacent to each other,
the optical waveguide being composed of a rib part and slab parts,
the rib part being relatively tall and being located in a center of the optical waveguide,
the slab parts being relatively short and being located at respective both ends of the optical waveguide, and
a same surface is formed by (i) an upper surface of each heater part Hi (where i=1, 2, . . . , n−1) and (ii) an upper surface of each of the slab parts.

8. The semiconductor optical integrated circuit as set forth in claim 7, wherein
the optical waveguide and the heater parts H1 through Hn−1 are provided on a same surface.

9. The semiconductor optical integrated circuit as set forth in claim 7, wherein
the heater parts H1 through Hn−1 are regions of the semiconductor layer to which regions a dopant is injected.

10. The semiconductor optical integrated circuit as set forth in claim 7, wherein
a common voltage is applied across the heater parts H1 through Hn−1.

11. The semiconductor optical integrated circuit as set forth in claim 7, wherein
a center-to-center distance between the heated section Ii and the heated section Ii+1, which are adjacent to each other, is not more than 4 μm.

12. A semiconductor optical integrated circuit as set forth in claim 7, further comprising:
a heater part H0; and a heater part Hn,
each heated section Ij (where j=1, 2, . . . , n) being arranged between a heater part Hj−1 and a heater part Hj which are adjacent to each other.

13. The semiconductor optical integrated circuit as set forth in claim 12, wherein
a same surface is formed by (i) an upper surface of each of the heater part H0 and the heater part Hn and (ii) an upper surface of each of the slab parts of the optical waveguide.

14. The semiconductor optical integrated circuit as set forth in claim 7, wherein
the semiconductor layer is made of silicon.

15. The semiconductor optical integrated circuit as set forth in claim 7, wherein
the rib part is taller than the slab parts.

* * * * *